(12) United States Patent
Sato

(10) Patent No.: US 7,368,973 B2
(45) Date of Patent: May 6, 2008

(54) TEMPERATURE SENSOR CIRCUIT

(75) Inventor: Yutaka Sato, Chiba (JP)

(73) Assignee: Seiko Instruments Inc. (JP)

( * ) Notice: Subject to any disclaimer, the term of this patent is extended or adjusted under 35 U.S.C. 154(b) by 733 days.

(21) Appl. No.: 10/965,125

(22) Filed: Oct. 14, 2004

(65) Prior Publication Data
US 2005/0105586 A1  May 19, 2005

(30) Foreign Application Priority Data
Oct. 28, 2003   (JP)   ............... 2003-367444

(51) Int. Cl.
  *G05F 1/10* (2006.01)
(52) U.S. Cl. ..................... 327/512; 327/538
(58) Field of Classification Search ............ 327/512, 327/513, 525, 538, 543
See application file for complete search history.

(56) References Cited
U.S. PATENT DOCUMENTS

| | | | | |
|---|---|---|---|---|
| 4,652,144 A | * | 3/1987 | Gunther et al. ............ 327/512 |
| 4,749,889 A | * | 6/1988 | Lagoni et al. ............... 327/513 |
| 5,589,792 A | * | 12/1996 | Brokaw ...................... 327/512 |
| 5,691,657 A | * | 11/1997 | Hirano et al. ................. 327/94 |
| 5,923,208 A | * | 7/1999 | Tasdighi et al. ............. 327/512 |
| 6,128,172 A | * | 10/2000 | Feldtkeller .................. 361/93.8 |
| 6,956,428 B1 | * | 10/2005 | Voo ............................. 327/538 |

* cited by examiner

Primary Examiner—Jeffrey Zweizig
(74) Attorney, Agent, or Firm—Adams & Wilks

(57) ABSTRACT

To provide a temperature sensor circuit capable of obtaining a highly precise output voltage as a desired output voltage. The temperature sensor circuit includes: at least a constant current source; and a base-to-emitter voltage multiplication circuit constructed by a bipolar transistor and resistors, in which a base current error compensation circuit is provided so as to eliminate an error of the base current of the bipolar transistor caused to flow through the resistor. Further, the temperature sensor circuit of the present invention has such a structure that a resistance value of the resistor that determines an output voltage may be controlled.

8 Claims, 4 Drawing Sheets

TEMPERATURE SENSOR CIRCUIT

BACKGROUND OF THE INVENTION

1. Field of the Invention

The present invention relates to a temperature sensor circuit configured with a semiconductor integrated circuit.

2. Description of the Related Art

A conventional temperature sensor circuit configured with a semiconductor integrated circuit is shown in FIG. 6. In general, in a temperature sensor circuit, a collector and a base of a bipolar transistor 12 are set at the same electric potential, and an emitter thereof is connected to a constant current source 11. That is to say, the bipolar transistor 12 is diode-connected, thereby outputting a base to emitter voltage (hereinafter referred to as "a VBE" for short) of the bipolar transistor 12 to an output terminal 10. In this case, it is generally known that the VBE is independent of a current value of the constant current source 11, and hence has a certain constant voltage value. Thus, when there is made a request to output an arbitrary voltage to the output terminal 10, it is difficult to respond to this request.

Next, a temperature sensor circuit configured with a base-to-emitter voltage multiplication circuit (hereinafter referred to as "a VBE multiplication circuit" for short) 18 is shown in FIG. 7. With respect to a configuration of the VBE multiplication circuit 18, an emitter of a bipolar transistor 12 is connected to a constant current source 11 and one terminal of a first resistor 13, and the first resistor 13 and a second resistor 14 are connected in series with each other through their adjacent terminals. In addition, the grounding terminal of the second resistor 14 and a collector of the bipolar transistor 12 are set at the same electric potential, i.e., at the grounding electric potential, and a base of the bipolar transistor 12 is connected to a node between the first and second resistors 13 and 14. In this case, when an output voltage at an output terminal 10 is assumed to be expressed by VOUT, a resistance of the first resistor 13 is assumed to be expressed by R1, and a resistance of the second resistor 14 is assumed to be expressed by R2, and currents caused to flow through the first and second resistors 13 and 14 are assumed to be equal to each other, the output voltage VOUT is expressed by Equation (1):

$$VOUT = VBE \times (R1+R2)/R2 \qquad (1)$$

From the foregoing, it is known that when the temperature sensor circuit is configured as shown in FIG. 7, the output voltage VOUT can be set to an arbitrary voltage depending on ratios of the resistance value of the first resistor 13 to the resistance value of the second resistor 14 (refer to a literature of "Analysis and Design of Analog Integrated Circuits", by P. R. Gray and R. G. Meyer, (pp. 268 to 270 and FIG. 4.27(a)).

However, a base current IB of the bipolar transistor 12 is also caused to flow through the second resistor 14. At this time, when a current caused to flow through the first resistor 13 is assumed to be expressed by I1, and a current caused to flow through the second resistor 14 is assumed to be expressed by I2, Equation (2) is obtained:

$$I2 = I1 + IB \qquad (2)$$

Thus, an error occurs in the currents caused to flow through the first and second resistors 13 and 14 due to the base current IB of the bipolar transistor 12. Consequently, it is difficult to set the output voltage VOUT as aimed using Equation (2). Moreover, it is difficult to set the output voltage VOUT as aimed owing to the dispersion in the characteristics of the bipolar transistor 12 and the characteristics of the two resistors 13 and 14.

SUMMARY OF THE INVENTION

In light of the foregoing, it is therefore an object of the present invention to provide a temperature sensor circuit capable of obtaining a highly precise output voltage as a desired output voltage.

In order to attain the above-mentioned object, according to the present invention, there is provided a temperature sensor circuit including: at least a constant current source; and a base-to-emitter voltage multiplication circuit constructed by a bipolar transistor and resistors, in which a base current error compensation circuit is provided so as to eliminate an error of the base current of the bipolar transistor caused to flow through the resistor. In addition, the temperature sensor circuit of the present invention has such a structure that a resistance value of the resistor that determines an output voltage VOUT may be controlled.

By adopting the above-mentioned structure, the present invention can provide the temperature sensor circuit capable of obtaining a highly precise output voltage as a desired output voltage and which is highly precise in output voltage.

DESCRIPTION OF THE PREFERRED EMBODIMENTS

First Embodiment

Figure 1:
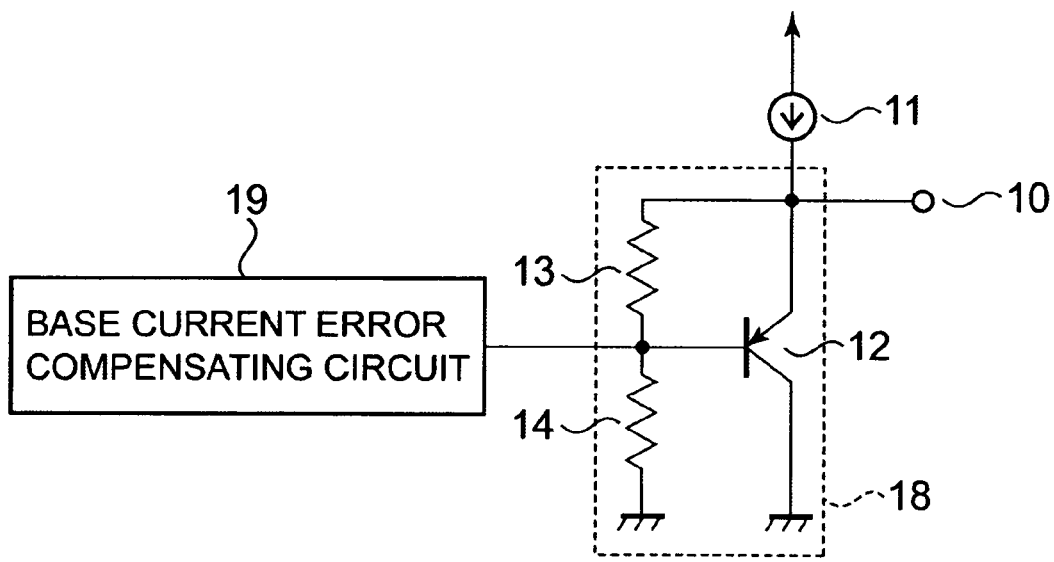
FIG. 1 is a circuit diagram showing a temperature sensor circuit according to a first embodiment of the present invention.
Figure 2:
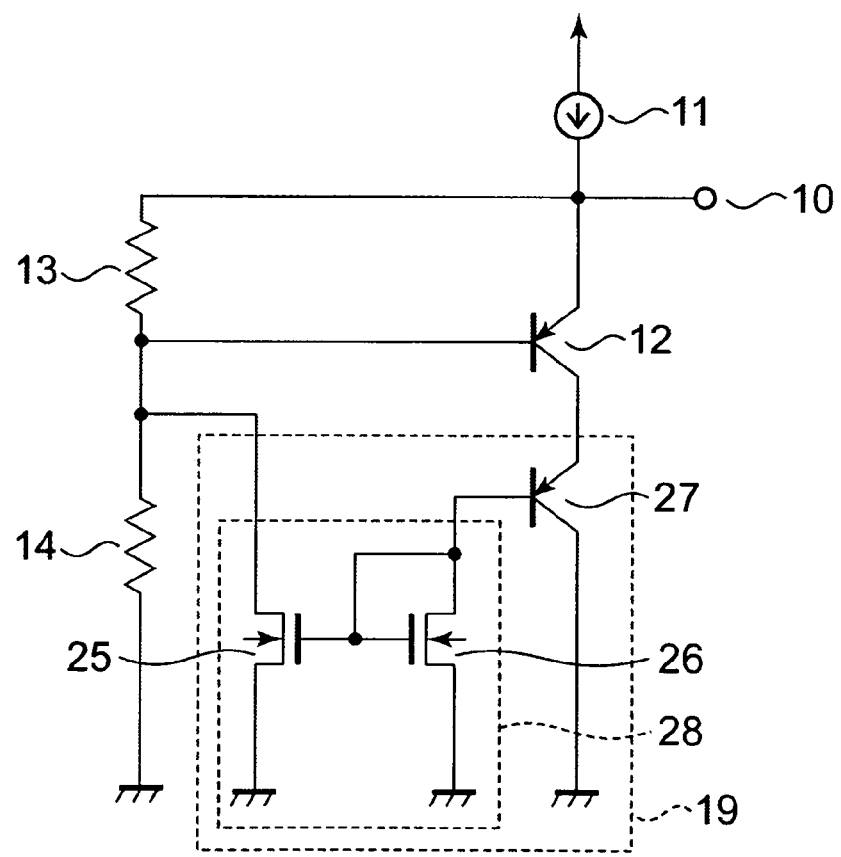
FIG. 2 is a detailed circuit diagram showing a part of the temperature sensor circuit according to the first embodiment of the present invention.
Figure 7:
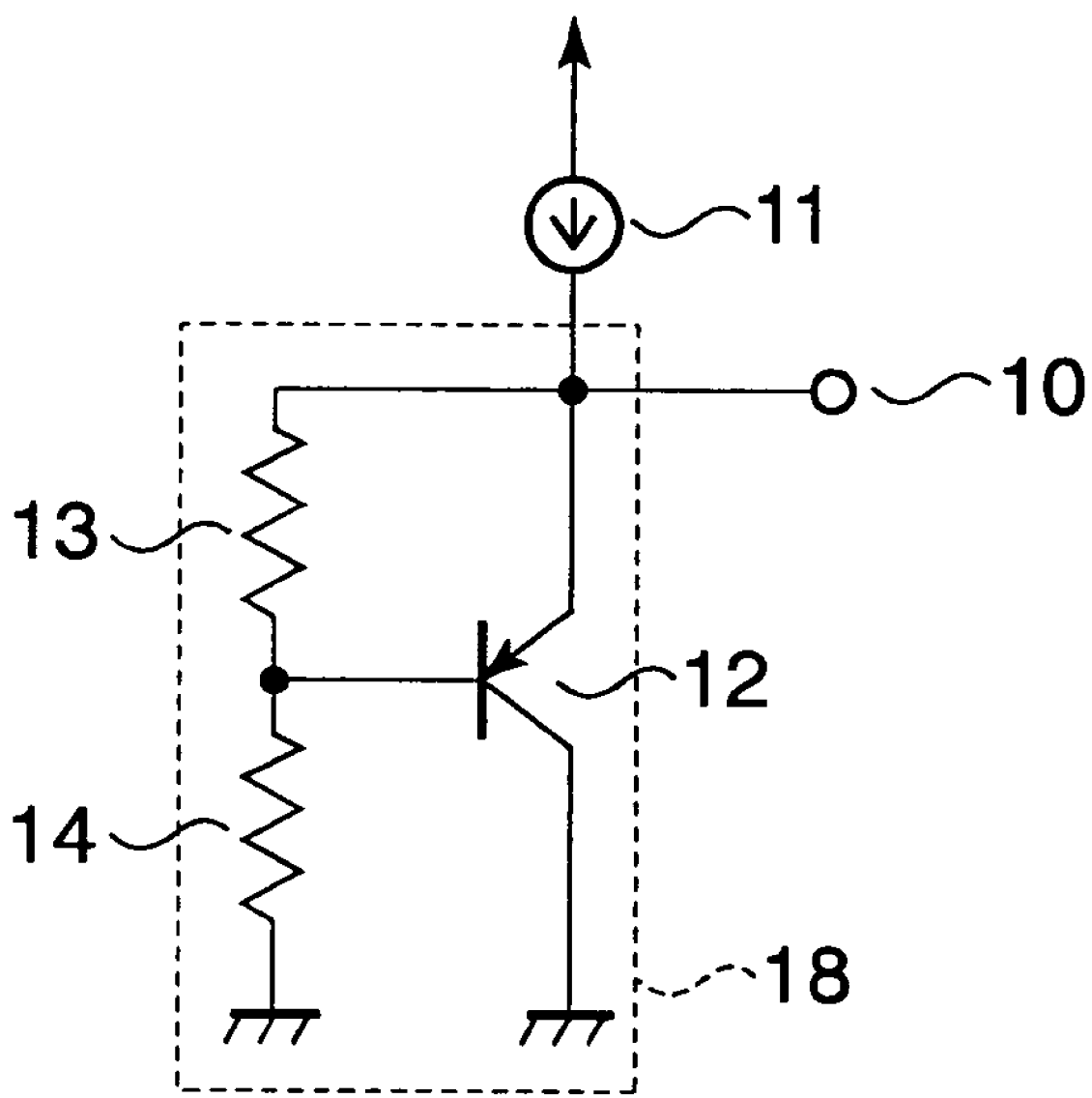
FIG. 7 is a circuit diagram showing another conventional temperature sensor circuit configured with a VBE multiplication circuit.

A temperature sensor circuit according to a first embodiment of the present invention is shown in FIG. 1. The temperature sensor circuit of the first embodiment shown in FIG. 1 is such that a base current error compensation circuit 19 is provided in the temperature sensor circuit shown in FIG. 7. For example, the base current error compensation circuit 19, as shown in FIG. 2, includes a bipolar transistor 27 having a base connected to a drain of a second N-channel MOS transistor 26, and a current mirror circuit 28 constituted by a first N-channel MOS transistor 25 and the second N-channel MOS transistor 26. Note that it is assumed that the characteristics of the bipolar transistors 12 and 27 are equal to each other and their emitter area sizes are also equal to each other, and the characteristics of the first and second N-channel MOS transistors 25 and 26 are equal to each other and their transistor sizes are equal to each other. An emitter of the bipolar transistor 27 is connected to a collector of the bipolar transistor 12, and a drain of the first N-channel MOS transistor 25 constituting a part of the current mirror circuit 28 is connected to a node between the first and second resistors 13 and 14. In this case, since the collector current caused to flow through the bipolar transistor 12 is equal to that caused to flow through the bipolar transistor 27, base currents IB which are equal to each other are obtained in the bipolar transistors 12 and 17, respectively. Thus, the base current IB generated in the bipolar transistor 27 is caused to flow through the second N-channel MOS transistor 26. On the other hand, the current mirror circuit causes the same current as that caused to flow through the second N-channel MOS transistor 26 to flow through the first N-channel MOS transistor 25. Thus, the base current IB generated in the bipolar transistor 12 is caused to flow through the first N-channel MOS transistor 25. As a result, the current caused to flow through the first resistor 13 becomes equal to that caused to flow through the second resistor 14, and thus it is possible to set the output voltage VOUT as aimed.

Second Embodiment

Figure 3:
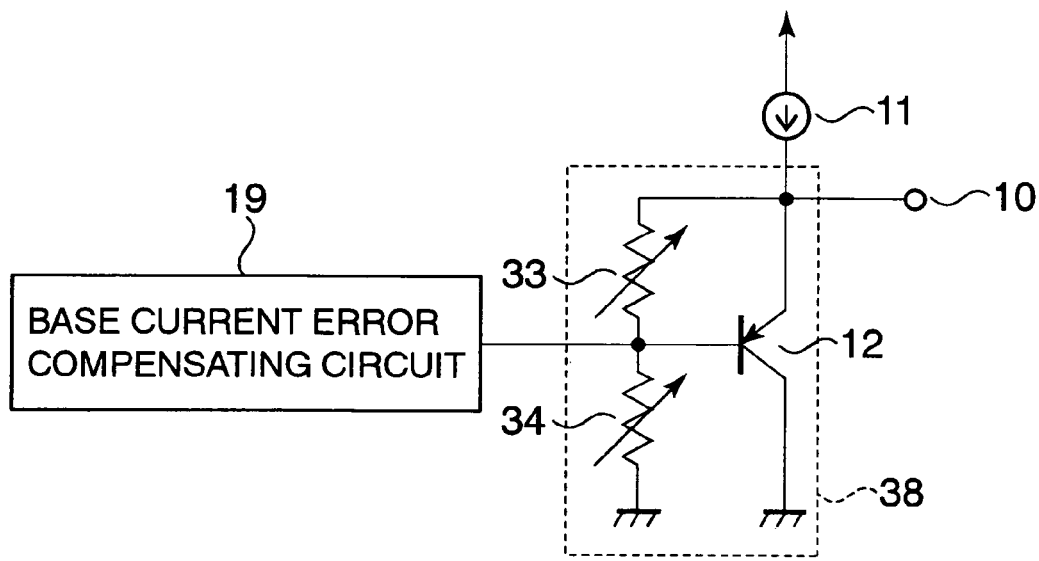
FIG. 3 is a circuit diagram showing a temperature sensor circuit according to a second embodiment of the present invention.

A temperature sensor circuit according to a second embodiment of the present invention is shown in FIG. 3. In the temperature sensor circuit of the first embodiment, the first and second resistors 13 and 14 are provided as fixed resistors. In the case of the first embodiment, however, if the shift in the output voltage VOUT due to the dispersion in characteristics of the bipolar transistors 12 and 17 and characteristics of the first and second resistors 13 and 14 is taken into consideration, then the fine adjustment of the output voltage VOUT is essential to the design of the temperature sensor circuit. In this case, at least one of the first and second resistors 13 and 14 of the first embodiment is replaced with a variable resistor, thereby allowing the output voltage VOUT to be finely adjusted. As a result, the output voltage VOUT can be set with more highly precision as compared with the case of adoption of the fixed resistors.

Third Embodiment

Figure 4:
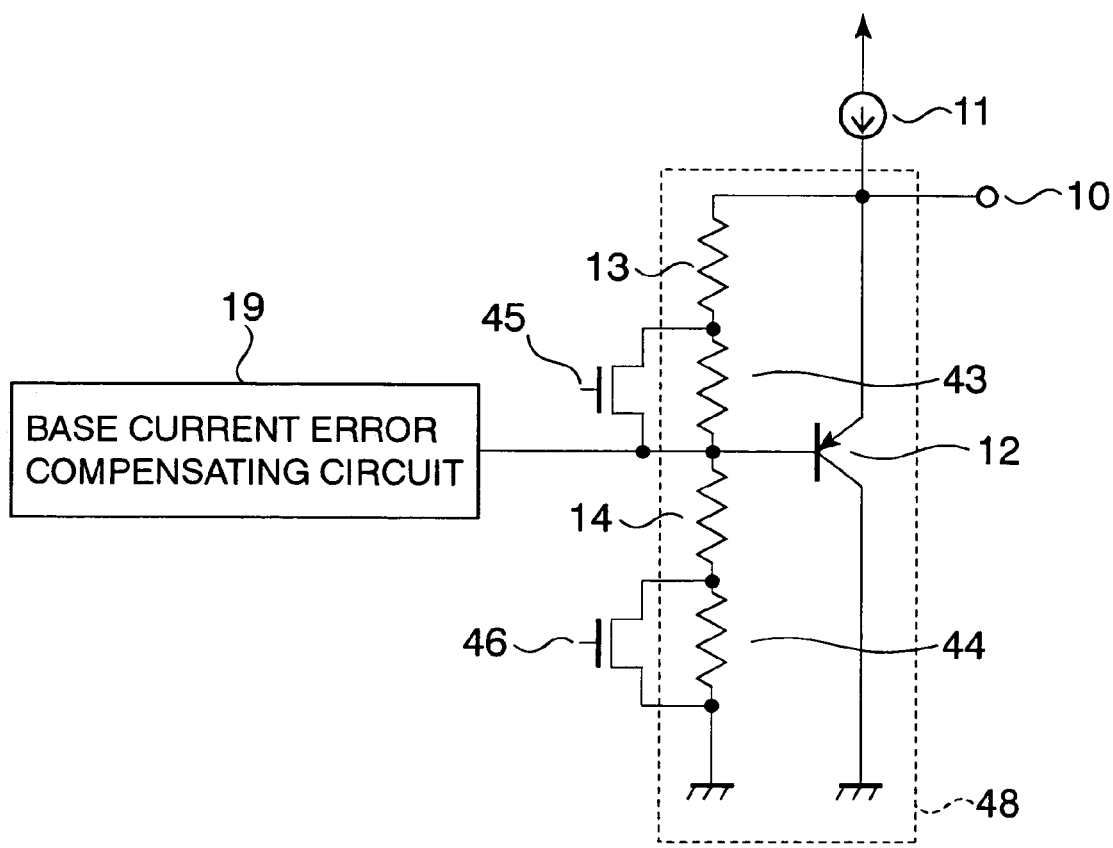
FIG. 4 is a circuit diagram showing a temperature sensor circuit according to a third embodiment of the present invention.

A temperature sensor circuit according to a third embodiment of the present invention is shown in FIG. 4. In the temperature sensor circuit shown in FIG. 4, the variable resistors of the temperature sensor circuit according to the second embodiment are constructed by MOS switches. With this circuit structure, the resistance values of the first or second resistors may be finely adjusted by ON/OFF operation of the MOS switches at a stage of post circuit production, thereby being capable of setting the output voltage VOUT precisely.

Fourth Embodiment

Figure 5:
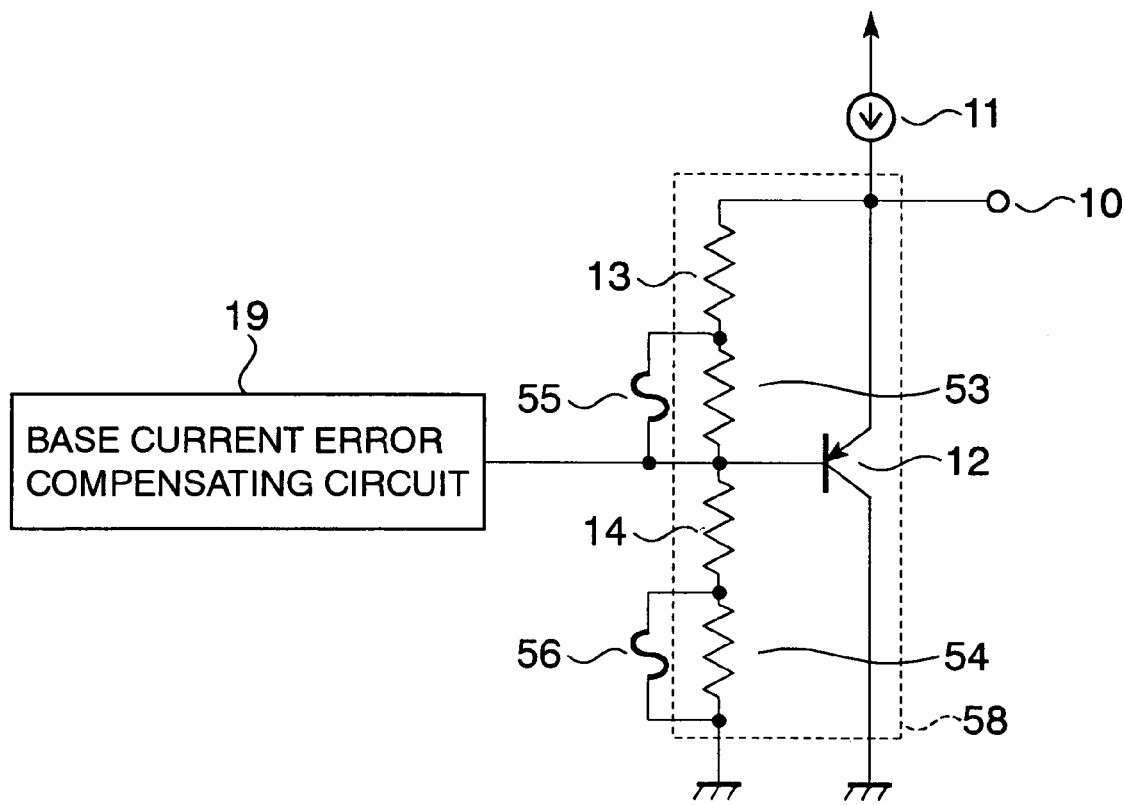
FIG. 5 is a circuit diagram showing a temperature sensor circuit according to a fourth embodiment of the present invention.
Figure 6:
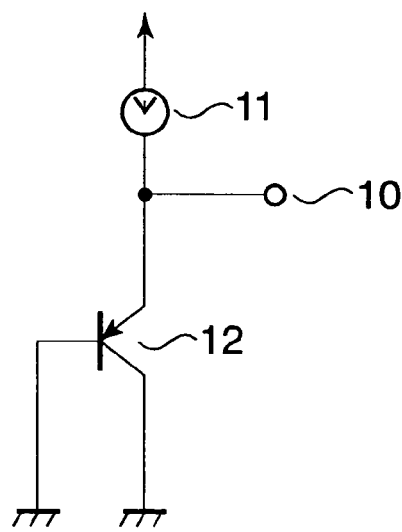
FIG. 6 is a circuit diagram showing a conventional temperature sensor circuit.

A temperature sensor circuit according to a fourth embodiment of the present invention is shown in FIG. 5. In a case of the temperature sensor circuit of the fourth embodiment shown in FIG. 5, the variable resistors of the temperature sensor circuit according to the second embodiment are replaced with resistors which have a fuse trimming function. Thus, it is obvious that the same effects as those of the third embodiment are obtained based on cut/noncut of the first and second fuses 55 and 56.

What is claimed is:

1. A temperature sensor circuit comprising:
   a constant current source;
   a base-to-emitter voltage multiplication circuit comprising:
      a bipolar transistor having an emitter connected to the constant current source and a grounding collector;
      a first resistor connected between the emitter and a base of the bipolar transistor; and
      a second resistor connected to a base of the bipolar transistor, one side of the resistor being grounded; and
   a base current error compensation circuit is connected to a node between the base of the bipolar transistor and the second resistor in order to eliminate an error of the base current of the bipolar transistor caused to flow through the second resistor.

2. A temperature sensor circuit according to claim 1, wherein one of the first and second resistors comprises a variable resistor.

3. A temperature sensor circuit according to claim 1, wherein a resistance value of the one of the first and second resistors is controlled by a MOS switch.

4. A temperature sensor circuit according to claim 1, wherein the resistance value of the one of the first and second resistors is controlled by utilizing fuse triming.

5. A temperature sensor circuit comprising at least a constant current source, a first bipolar transistor having an emitter connected to the constant current source, a second bipolar transistor having an emitter connected to a collector of the first bipolar transistor and having the same characteristics as those of the first bipolar transistor, a first resistor connected between the emitter and a base of the first bipolar transistor, a second resistor connected to a base of the first bipolar transistor, and a current mirror circuit having one terminal connected to a base of the second bipolar transistor, wherein another terminal of the current mirror circuit is connected to a node between the base of the first bipolar transistor and the second resistor in order to eliminate a base current of the first bipolar transistor from a current caused to flow through the second resistor.

6. A temperature sensor circuit according to claim 5, wherein one of the first and second resistors comprises a variable resistor.

7. A temperature sensor circuit according to claim 5, wherein a resistance value of the one of the first and second resistors is controlled by a MOS switch.

8. A temperature sensor circuit according to claim 5, wherein the resistance value of the one of the first and second resistors is controlled by utilizing fuse trimming.

* * * * *